(12) United States Patent
Peddicord

(10) Patent No.: US 7,086,341 B2
(45) Date of Patent: Aug. 8, 2006

(54) CONNECTOR AND HUB HAVING LOCKING ELEMENT

(76) Inventor: Donald B. Peddicord, P.O. Box 1936, Durant, OK (US) 74702

( * ) Notice: Subject to any disclaimer, the term of this patent is extended or adjusted under 35 U.S.C. 154(b) by 319 days.

(21) Appl. No.: 10/379,421

(22) Filed: Mar. 4, 2003

(65) Prior Publication Data

US 2003/0215375 A1    Nov. 20, 2003

Related U.S. Application Data

(63) Continuation-in-part of application No. 09/518,624, filed on Mar. 3, 2000, now Pat. No. 6,814,946.

(51) Int. Cl.
A47B 47/00 (2006.01)
(52) U.S. Cl. .................... 108/180; 108/153.1
(58) Field of Classification Search ............... 108/180, 108/190, 153.1, 156, 157.18, 158.11, 158.17; 248/222.11, 221.11, 745.1; 312/265.1, 265.2; 403/170, 121, 242, 252, 263, 322.1, 257, 403/256, 403

See application file for complete search history.

(56) References Cited

U.S. PATENT DOCUMENTS

| | | | |
|---|---|---|---|
| 945,989 A | 1/1910 | Sponenbarger |
| 1,385,903 A | 1/1921 | Cochran |
| 1,932,117 A | 10/1933 | O'Brien et al. |
| 1,986,774 A | 1/1935 | Hopfner |
| 2,192,451 A | 3/1940 | Moore |
| 2,316,526 A | 4/1943 | McDonald |
| 2,657,964 A | 11/1953 | Watrous |
| 2,669,117 A | 2/1954 | Fuhrmann |
| D181,083 S | 9/1957 | Wells |
| 2,829,934 A | 4/1958 | Schulze |
| 2,895,753 A | 7/1959 | Fentiman |
| 3,082,587 A | 3/1963 | Brimberg |
| 3,374,891 A | 3/1968 | Buchmann |
| 3,432,038 A | 3/1969 | Heskett |
| 3,460,566 A | 8/1969 | Heartstedt et al. |
| 3,462,110 A * | 8/1969 | Cheslock .................. 248/219.4 |
| 3,502,442 A | 3/1970 | Campbell et al. |
| 3,623,978 A | 11/1971 | Boze |
| 3,684,457 A | 8/1972 | Pinto et al. |
| 3,732,165 A | 5/1973 | Campbell |
| 3,760,753 A | 9/1973 | Mertens |
| 3,787,018 A | 1/1974 | Nathan |
| 3,851,980 A * | 12/1974 | Worth et al. ................. 403/172 |
| 4,013,556 A | 3/1977 | Evans |
| 4,163,537 A * | 8/1979 | Mourgue .................. 248/188.1 |

(Continued)

FOREIGN PATENT DOCUMENTS

CA    2335682    9/2001

(Continued)

Primary Examiner—Jose V. Chen
(74) Attorney, Agent, or Firm—Thompson & Gustavson, L.L.P.

(57) ABSTRACT

A structure (10, 44, 50) can be formed by using a plurality of hubs (12), connectors (14) and elongate members (16). The hubs (12) have a series of locking slots (18) formed at regular intervals about the outer circumference. A T-shaped portion (32) of a connector (14) is slid into a selected locking slot (18) until a flexible catch (34) on the connector (14) engages a locking bar (20) on the hub (12) to securely attach the connector (14) to the hub (12). Both the hubs (12) and connectors (14) can frictionally receive elongate members (16), allowing the construction of various types of structure, such as furniture. The structures can be assembled without tools, and can be readily be disassembled if desired.

18 Claims, 4 Drawing Sheets

U.S. PATENT DOCUMENTS

| | | | |
|---|---|---|---|
| 4,235,340 A | 11/1980 | Clack et al. | |
| 4,242,969 A * | 1/1981 | Checkwood et al. | 108/158.11 |
| 4,260,487 A | 4/1981 | Gruett | |
| D264,694 S | 6/1982 | Takahashi | |
| 4,422,803 A | 12/1983 | Wetmore | |
| 4,448,695 A | 5/1984 | Gordon | |
| D278,110 S | 3/1985 | Boland, II | |
| 4,623,367 A | 11/1986 | Paulson | |
| 4,630,550 A * | 12/1986 | Weitzman | 108/155 |
| 4,718,447 A | 1/1988 | Marshall | |
| 4,753,726 A | 6/1988 | Suchanek | |
| 4,764,280 A | 8/1988 | Brown et al. | |
| 4,946,600 A | 8/1990 | Shin | |
| D316,282 S | 4/1991 | Winston | |
| 5,061,219 A | 10/1991 | Glickman | |
| 5,158,187 A * | 10/1992 | Taub | 211/186 |
| 5,290,004 A | 3/1994 | Frost et al. | |
| 5,310,488 A | 5/1994 | Hansen et al. | |
| 5,340,485 A | 8/1994 | Bradley et al. | |
| 5,411,717 A | 5/1995 | Peddicord et al. | |
| D363,971 S | 11/1995 | Peddicord et al. | |
| D376,837 S | 12/1996 | Peddicord et al. | |
| 5,643,541 A | 7/1997 | Peddicord et al. | |
| 5,647,650 A * | 7/1997 | Daugherty et al. | 312/265.1 |
| 5,715,760 A * | 2/1998 | Frascaroli et al. | 108/50.02 |
| 5,788,933 A | 8/1998 | Peddicord | |
| D408,905 S | 4/1999 | Hadjikyriacou | |
| 5,899,423 A * | 5/1999 | Albertini | 108/50.11 |
| 5,941,183 A * | 8/1999 | Ming-Shun | 108/153.1 |
| 6,089,941 A | 7/2000 | Glickman et al. | |
| 6,183,704 B1 | 2/2001 | Peddicord | |
| 6,231,416 B1 | 5/2001 | Clever et al. | |
| 6,315,628 B1 | 11/2001 | Quercetti | |
| 6,341,566 B1 * | 1/2002 | Hwang | 108/180 |
| 6,589,491 B1 | 7/2003 | Peddicord et al. | |

FOREIGN PATENT DOCUMENTS

| | | |
|---|---|---|
| DE | 64147 | 9/1892 |
| DE | 3405862 A1 * | 8/1985 |

* cited by examiner

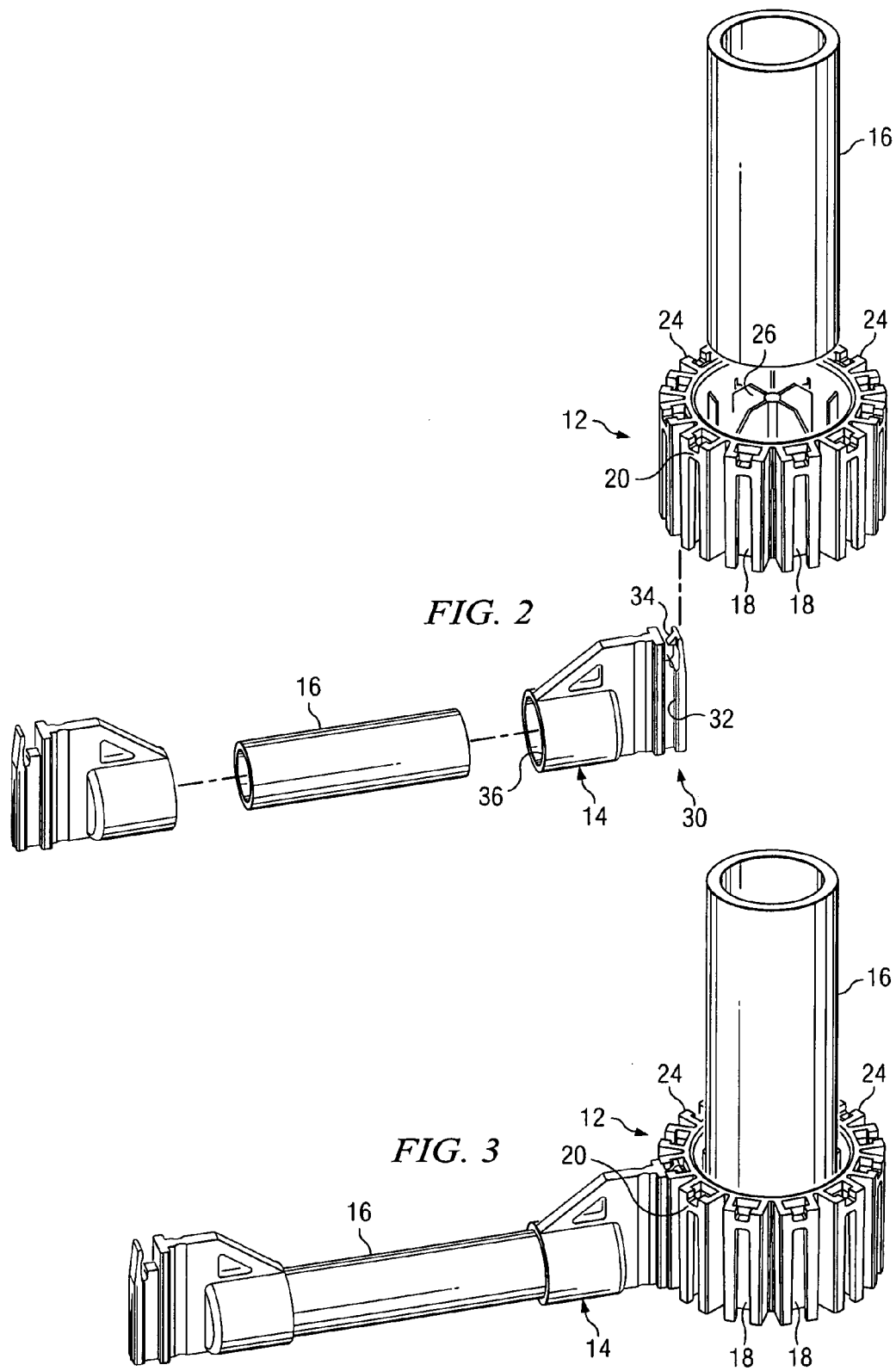

CONNECTOR AND HUB HAVING LOCKING ELEMENT

CROSS-REFERENCE TO RELATED APPLICATIONS

This application is a continuation-in-part of U.S. patent application Ser. No. 09/518,624 filed Mar. 3rd, 2000 now U.S. Pat. No. 6,814,946.

TECHNICAL FIELD OF INVENTION

This invention relates to a connector and hub which can be used to rapidly construct an article, such as furniture.

BACKGROUND OF INVENTION

In our modern society, there is an ongoing need for structures which can be quickly and easily assembled yet are sturdy in use. In addition, it is an advantage to be able to disassemble such a structure quickly and easily in the event the structure must be moved or make room for another structure. This is particularly true of furniture. Quite often, an office or residence may need a particular type of furniture for only a short while. It would be an advantage to quickly assemble such furniture for the period needed and then disassemble the furniture when no longer needed.

SUMMARY OF INVENTION

In accordance with one aspect of the present invention, a structure is constructed using a plurality of hubs and connectors. Each of the hubs has a locking element. In another aspect of the present invention, each of the hubs can be provided with a plurality of locking elements formed by locking slots about the circumference thereof. In accordance with another aspect of the present invention, the locking elements in the hub can include a T-shaped slot. In accordance with another aspect of the present invention, the hub can include a plurality of T-shaped slots distributed around the outer circumference of the hub. The plurality of T-shaped slots can be distributed around the circumference at a spacing of 30 degree angles to adjacent T-shaped slots. The hub can further include a locking bar at the end of the T-shaped slots.

The connector can similarly have a locking element. Elongate numbers can be secured to the connector.

The hubs and connectors can be used to construct any type of structure. For example, the hubs and connectors, along with a plurality of elongate members, can form a chair, a table, a shelf or other item of furniture.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2 is an exploded view of a connector and hub forming a portion of the present invention being assembled;

FIG. 3 is a perspective view of the hubs and connector assembled;

DETAILED DESCRIPTION

Figure 1:
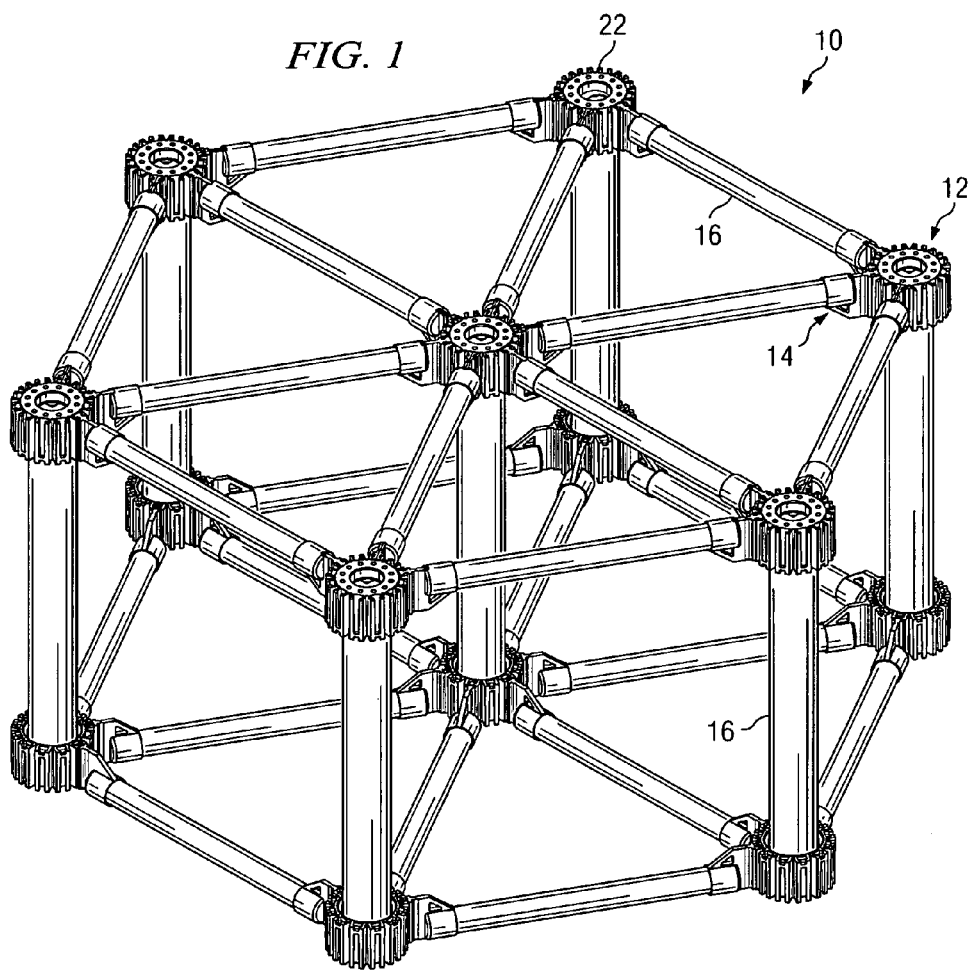
FIG. 1 is a perspective view of a structure formed in accordance with the teachings of the present invention.

With reference now to the accompanying drawings, where like or corresponding parts are designated by the same reference numeral, and with specific reference to FIGS. 1–3, a structure 10 constructed of hubs 12, connectors 14 and elongate members 16 will be described. Each of the hubs 12 have a number of locking slots 18, with each slot having a locking bar 20. A first side 22 of each of the hubs 12 is preferably flat, while the second side 24 is hollow to receive an elongate number 16. A cruciform 26 is formed in the hub in the second side 24 to frictionally engage the end of elongate number 16. Preferably, the hub has twelve slots distributed at uniform 30 degree spacings about the outer periphery of the hub 12. In one design constructed in accordance with the teachings of the present invention, each of the hubs 12 is about 3.15 inches in diameter. However, hubs 12 can be constructed of any size desired, such as 6, 8 or 10 inches in diameter. The second side 24 is designed to accommodate elongate number 16 formed of schedule 40 PVC pipe meeting ASTM-D-1785 and ASTM-D-2665 standards (approved for potable water). Such pipe has a minimum wall thickness of 0.148 in. plus or minus 0.02 in., with an outside pipe diameter of 1.9 inches plus or minus 0.006 inches.

The connectors 14 can be seen to have a locking member 30 which includes a T-shaped portion 32 to slide into the key slot cross-section of the locking slots 18 of a corresponding hub 12. The locking member 30 also has a flexible catch 34 which is deflected over the locking bar 20 when fully inserted into the locking slot 18 to lock the connector 14 in the locking slot 18. The connector 14 also includes a holder 36 having an aperture to receive an elongate number 16. Preferably, the aperture also includes a cruciform 26 to provide a tight frictional engagement with the elongate member 16.

The elongate members 16 can be formed of any suitable material, but are preferably PVC pipe sections. While shown as circular in cross-section, the elongate members 16 can have any desired cross-section, such a square, triangular, hexagonal and the like. The elongate members 16 can be hollow, as illustrated, or solid, if desired. Also, while illustrated as linear members, the elongate members can be formed in various curved shapes.

The structure 10 can be assembled from a number of the hubs 12, connectors 14 and elongate members 16. As best seen in FIG. 2, each connector 14 can be slid into one of the locking slots 18 of a corresponding hub 12 and be locked in place with the engagement between the flexible catch 34 and the locking bar 20. An elongate member 16 of suitable length can be received in the holder 36 of the connector 14 and an elongate member 16 can also be received in the second side 24 of the hub 12. A structure such as illustrated in FIG. 1 can be formed by simply assembling the hubs 12, connectors 14 and elongate members 16 as illustrated. While it would be possible to permanently form structure 10 by applying a suitable adhesive between each of the joints of the hubs 12, connectors 14 and elongate members 16, it is preferable that the structure 10 is simply held together by frictional engagement between the various elements. As can readily be seen, the engagement between the flexible catch 34 of a connector 14 and the locking bar 20 of a hub 12 provides a very secure engagement between the hubs and connectors. However, if it is desirable to disassemble a structure 10, it can readily be disassembled by simply pulling elongate members 16 out of the respective hubs 12 and connectors 14. The connectors 14 can be removed from the hubs 12 by simply deflecting the flexible catch 34 by hand or with a suitable tool to allow the T-shaped portion 32 of the connector 14 to be slid out of the locking slot 18 of the attached hub 12.

Figure 4:
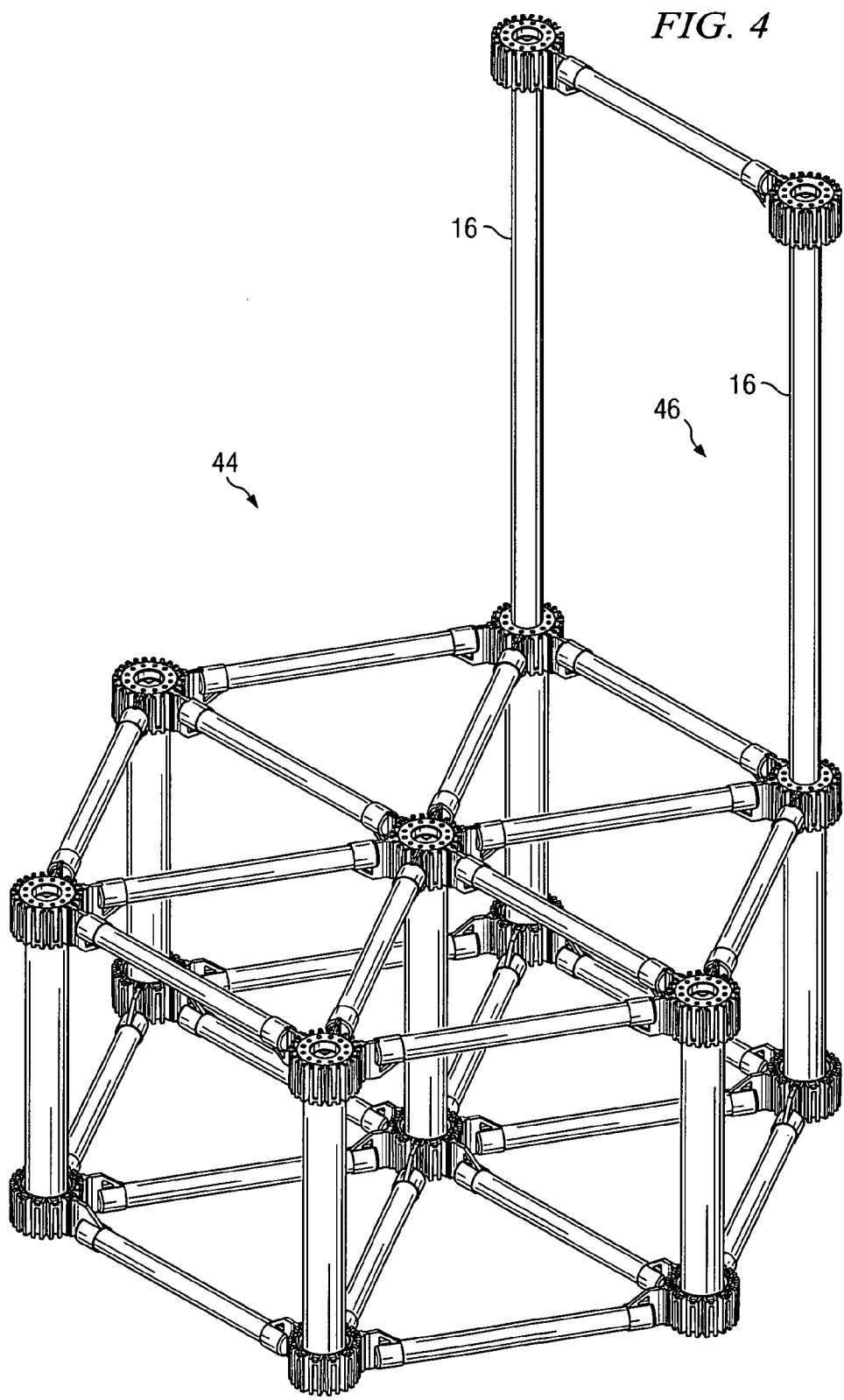
FIG. 4 is a perspective view of a chair formed in accordance with the teachings of the present invention.
Figure 5:
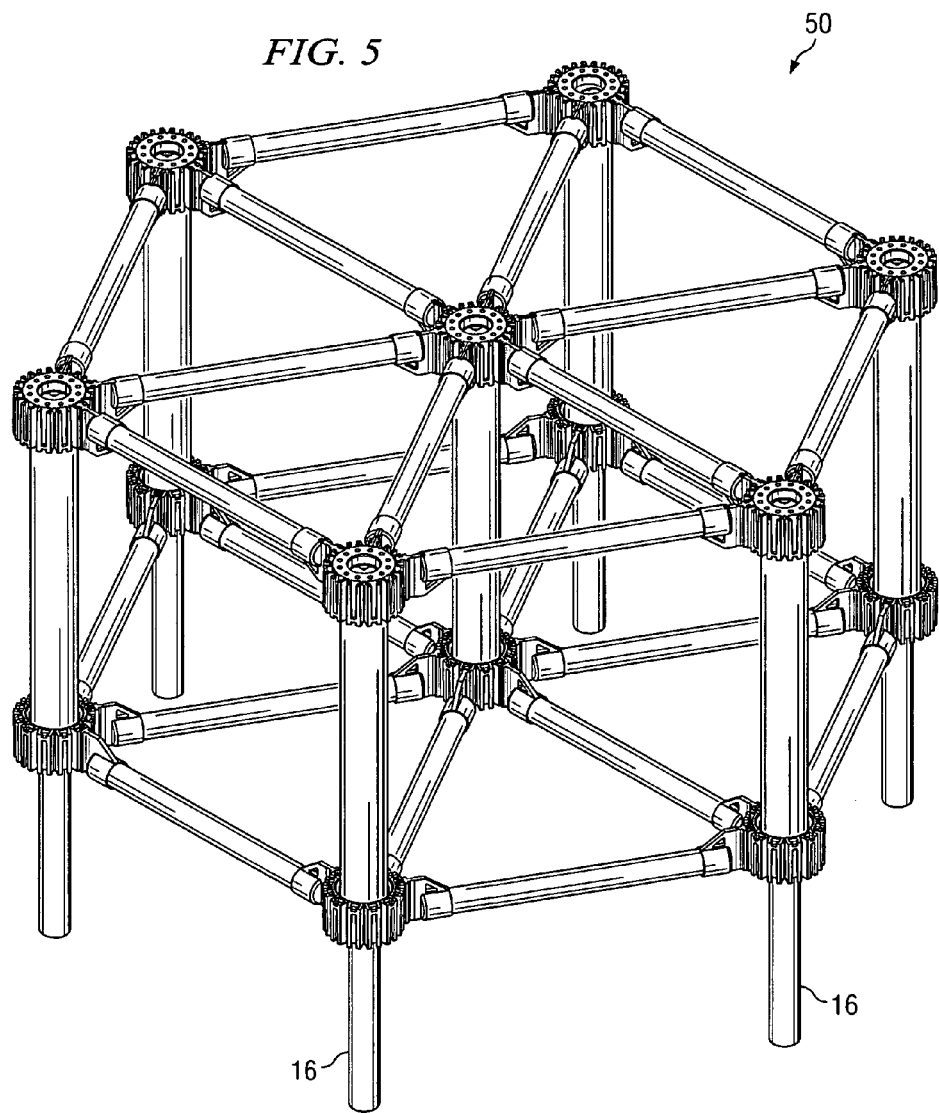
FIG. 5 is a perspective view of a table formed in accordance with the teachings of the present invention.

As can be understood, the hubs 12, connectors 14 and suitable elongate members 16 can be assembled in any desired configuration to form a structure for any desired purpose. The structure 10 of FIG. 1, for example, can form a table by placing a suitable tabletop over the upper layer of hubs 12, connectors 14 and elongate members 16. FIG. 4 illustrates a chair 44 formed by hubs 12, connectors 14 and elongate members 16. The back 46 of the chair is formed by two vertical elongate members 16 and a suitable combination of hubs 12, connectors 14 and horizontal elongate member 16 at the top of the back. FIG. 5 similarly illustrates a table 50 which has elongate members 16 extending from the lower layer of hubs 12 to form legs on the table.

The entire disclosure of pending U.S. patent application Ser. No. 09/518,624 filed Mar. 3, 2000 is hereby incorporated by reference in its entirety.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

The invention claimed is:

1. A furniture structure, comprising:
at least one hub, said hub having at least one locking element; and
at least one connector, said connector having a locking element engaging the locking element of the hub, the locking element of the hub having a locking bar and a T-shaped slot open at one end and closed at an opposite end by the locking bar, the connector having a flexible catch which deflects over the locking bar and is locked to the locking bar when the connector engages the hub.

2. The structure of claim 1 wherein said hub is provided with a plurality of locking elements about the outer circumference thereof.

3. The structure of claim 2 wherein the locking element in the connector includes a T-shaped portion received in the T-shaped slot.

4. The structure of claim 3 wherein the plurality of T-shaped slots are distributed about the circumference at 30 degree angles to adjacent T-shaped slots.

5. The structure of claim 1 forming an article of furniture.

6. The structure of claim 5 forming a table.

7. The structure of claim 5 forming a chair.

8. The structure of claim 1 further comprising at least one elongate member frictionally engaging one of said hub and connector.

9. The structure of claim 8 wherein the elongate member is formed of a PVC plastic pipe section.

10. The structure of claim 8 wherein the hub has a opening with a cruciform to receive the elongate member.

11. The structure of claim 8 wherein the connector has a holder with an opening having a cruciform to receive the elongate member.

12. The structure of claim 1 wherein the hub and connector are formed of plastic.

13. A method of assembling a furniture structure comprising the steps of:
inserting a connector into a hub to lock the connector in the hub, the hub having a locking bar and a T-shaped slot with one end open and an opposite end closed by the locking bar wherein the step of inserting the connector into the hub includes the step of sliding a T-shaped portion on the connector into the T-shaped slot on the hub until a flexible catch on the connector deflects over the locking bar and engages the locking bar on the hub.

14. The method of claim 13 further including the step of frictionally attaching an elongate member formed by a PVC pipe section to one of said hub and connector.

15. The method of claim 13 further comprising the step of inserting a plurality of connectors into a plurality of hubs to form a structure.

16. The method of claim 15 further comprising the step of forming a table.

17. The method of claim 15 further comprising the step of forming a chair.

18. A furniture structure, comprising:
at least one hub, said hub having at least one locking element, the locking element of the hub being a T-shaped slot open at one end and closed at an opposite end by a locking bar;
at least one connector, said connector having a locking element engaging the locking element of the hub, the locking element of the connector includes a T-shaped portion received in the T-shaped slot of the hub and having a flexible catch that deforms over the locking bar and locks to the locking bar;
the hub having a plurality of locking elements distributed about a circumference thereof at 30 degree angles to adjacent locking elements, and
at least one elongate member formed of a PVC plastic pipe section, the elongate member frictionally engaging one of the hub and connector, the hub and connector each having a opening with a cruciform to receive the elongate member, the hub, connector and elongate member forming the furniture structure.

* * * * *